(12) United States Patent
Maruyama

(10) Patent No.: US 6,486,969 B1
(45) Date of Patent: Nov. 26, 2002

(54) IMAGE PROCESSING APPARATUS, INFORMATION PROCESSING APPARATUS AND PRINTER

(75) Inventor: Michio Maruyama, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/135,400

(22) Filed: Aug. 18, 1998

(30) Foreign Application Priority Data

Aug. 28, 1997 (JP) ............................................. 9-232639

(51) Int. Cl.⁷ ............................ G06F 3/12; G06F 13/00
(52) U.S. Cl. ..................................... 358/1.15; 358/1.16
(58) Field of Search ............................. 358/1.15, 1.16, 358/1.17, 1.14

(56) References Cited

U.S. PATENT DOCUMENTS

| | | | |
|---|---|---|---|
| 5,410,672 A | * 4/1995 | Sodek, Jr. et al. | 395/425 |
| 5,784,582 A | 7/1998 | Hughes | 395/297 |
| 5,923,829 A | * 7/1999 | Ishii et al. | 395/182.5 |
| 5,959,656 A | * 9/1999 | Dhong et al. | 347/254 |
| 6,003,100 A | * 12/1999 | Lee | 710/102 |
| 6,070,212 A | * 5/2000 | Yasuda et al. | 710/107 |
| 6,141,290 A | * 10/2000 | Cowles et al. | 365/230.06 |

FOREIGN PATENT DOCUMENTS

| | | | |
|---|---|---|---|
| EP | 0 590 968 A2 | 4/1994 | G06F/15/72 |
| WO | 96/20446 | 7/1996 | G06F/12/06 |

* cited by examiner

Primary Examiner—Joseph Mancuso
Assistant Examiner—Douglas Tran
(74) Attorney, Agent, or Firm—Sughrue Mion, PLLC

(57) ABSTRACT

An image processing apparatus which is adapted for image processing for reading/writing a large amount of data from/into an RAM and which has a high processing speed. A DRAM bus to which an SDRAM unit is connected is connected to a CPU bus through a bus driver so that a CPU can read/write data from/into the SDRAM unit directly to perform synchronous input/output processing between the CPU and the SDRAM unit. Thus, high speed data transfer can be performed, and the driving capability of the RAM bus is heightened by the bus driver so that the capacity of the SDRAM unit can be made large. Consequently, data can be transferred to a large capacity of SDRAM which can store a large amount of data necessary for image processing to make it possible to provide a printer which is both high in processing speed and has a high data capacity.

10 Claims, 6 Drawing Sheets

IMAGE PROCESSING APPARATUS, INFORMATION PROCESSING APPARATUS AND PRINTER

BACKGROUND OF THE INVENTION

1. Field of the Invention

The present invention relates to an information processing apparatus adapted for dealing with a large amount of image-forming data in a printer controller, or the like.

2. Summary of the Related Art

FIG. 6 shows the schematic configuration of a printer 1 such as a laser printer, or the like, for performing page printing, which does not embody the present invention. This printer 1 has an image processing portion 5 for receiving print input data from a host side such as a personal computer, or the like, and converting the input data into output data configured so as to be able to be printed by a printing mechanism or engine 2 provided for performing printing on printing paper (or other appropriate recording medium) on the basis of the output data.

The image processing portion 5 includes an input interface circuit portion 11 for receiving input data from the host, a program storage ROM 15 which stores a program, or the like, for interpreting the input data and for converting the input data into output data for generating an image. The image processing portion 5 also includes a font storage ROM 16 which stores font bit map data to convert the input data into data allowed to be printed actually, and a DRAM 14 for storing the output data or storing intermediate data, or the like, generated in the middle of conversion of the input data into the output data. These constitutional parts are connected, through a bus 17, to a CPU 13 which controls conversion in accordance with the program stored in the ROM 15.

After the data input from the host is converted into output data in the image processing portion 5, the output data is supplied to the printing mechanism 2 through a video interface circuit portion 12 connected to the bus 17. As a result, printing is performed page-by-page.

The video interface circuit portion 12 is provided with an FIFO memory for temporarily storing DMA-transferred output data, and a shift register for converting parallel data outputted from the FIFO memory into serial data. Accordingly, the output data serialized in the raster direction is transferred to the printing mechanism 2. Further, control signals such as a command signal, a status signal, etc., can be exchanged between the CPU 13 of the image processing portion 5 and the printing mechanism 2 through the video interface circuit portion 12 so that the CPU 13 can control the printer 1 as a whole.

The image processing portion 5 having the ROMs 15 and 16, etc., connected to the bus 17 to which also the CPU 13 is connected, can be provided inexpensively if the CPU 13 can make direct access to the ROM 15, or the like, at a low speed. However, because it is impossible to use any high-throughput processor as the CPU 13, the image processing portion 5 is unsuitable for processing a large amount of data at a high speed.

Therefore, as shown in FIG. 7, a CPU 18 capable of operating at a high speed is used in a printer 1 for processing a large amount of data at a high speed. In the case where the CPU 18 operates with respect to low-operating-speed memories such as ROMs 15 and 16, etc., a system is employed in which the operating speed difference between the CPU 18 and the ROM 15, or the like, is absorbed by a memory controller 20 connected to the CPU 18 through a high-speed CPU bus 19.

In the image processing portion 6 shown in FIG. 7, the CPU bus 19 and the memory bus 17 connected to memories are independent of each other, so that internal processing can be made at a high speed by using the high-speed CPU 18. However, because the processing speed of the CPU 18 is dominated by the operating speed of memories such as DRAM 14, ROMs 15 and 16, etc., when access is made to these memories, the overall processing speed in the image processing portion 6 cannot be increased significantly despite the fact that the CPU 18 has a heightened operating frequency.

Although the processing speed of the DRAM 14 is relatively high compared with the processing speed of the ROMs 15 and 16, it is of greater importance to improve the input/output processing speed of the DRAM 14 in order to deal with a large amount of data in the image processing apparatus. A synchronous DRAM (hereinafter referred to as SDRAM) supplied with a synchronous clock pulse signal and capable of reading/writing data in accordance with the input clock has been developed so that, for example, the SDRAM can be operated at the same speed as that of the CPU 18 if the SDRAM is supplied with a clock pulse signal of the same operating frequency as that of the CPU 18. Accordingly, the operation of reading/writing a large amount of output data or intermediate data can be carried out at a high speed, so that the processing speed of the image processing portion 6 can be improved.

Because reading/writing is performed through the CPU 18 and the memory controller 20 even in the case where such an SDRAM is used as the DRAM 14, the time for processing in the memory controller 20 is required. Further, because not only the DRAM 14 but also the ROMs 15 and 16 and other interface portions are connected to the memory bus 17, the length of wiring for transmitting signals becomes large. Accordingly, the transmission speed becomes low and reflection as well as radiation noise of signal lines becomes large, so that the operating frequency is limited. Accordingly, the SDRAM capable of operating at the same speed as that of the CPU 18 cannot be utilized effectively.

SUMMARY OF THE INVENTION

It is therefore an object of the present invention to provide an image processing apparatus which is so high in processing speed as to be adapted for image processing in which a large amount of data are read-from/written-in a DRAM.

It is another object of the present invention to provide an image processing apparatus in which a large capacity of DRAM is set in the image processing apparatus so that a large amount of data can be inputted/outputted in a short time, and a CPU can make access to the DRAMs at a high speed.

It is a further object of the present invention to provide a printer using the aforementioned image processing apparatus to make image processing speed high to thereby perform high-resolution printing at a high speed.

Further, conversion of a large amount of input data into image-forming output data is required not only in the case of a printer but also in the case where an image is displayed on a display unit.

It is therefore a further object of the present invention to provide an information processing apparatus in which a large amount of data are processed in a short time so that the data can be written-in/read-from a large capacity of DRAM at a high speed.

According to the present invention, therefore, a RAM for storing a large amount of intermediate data or output data for image processing is connected not to a memory bus but to a CPU bus through which data can be directly read-from/written-into the CPU. That is, according to the present invention, an image processing apparatus is provided for converting input data into image-forming output data by using programs or font data stored in at least one ROM unit, and for outputting the image-forming output data. The image processing apparatus according to the present invention includes a CPU, at least one RAM unit for storing at least one of output data or intermediate data converted by the CPU, a memory controller for controlling access to the ROM unit and the RAM unit, a first bus to which the memory controller and the CPU are connected, and a second bus to which the memory controller and the ROM unit are connected. The RAM unit is connected to the first bus.

As described above, the RAM unit, which is capable of performing high-speed processing compared with ROM, is disposed in the vicinity of the CPU so that the CPU can access the RAM unit directly without going through the memory controller. Accordingly, the speed of processing between the CPU and the RAM unit can be improved greatly. Particularly in the image processing apparatus, input/output processing of output data or intermediate data with respect to the RAM unit occupies a large part of the content of processing. Accordingly, when this input/output processing time is shortened, the processing speed of the image processing apparatus as a whole can be improved greatly.

Further, when an SDRAM is utilized as the RAM unit connected to the first bus, the RAM unit can be operated by an operating clock signal which has the same operating frequency as is used in the CPU. Accordingly, reading/writing data from/into the RAM unit can be performed without reducing the processing speed of the CPU and without providing any wait state.

Further, in the image processing apparatus, a large amount of data are inputted into/outputted from the RAM unit. Accordingly, it is necessary to provide a plurality of RAM units. Therefore, when RAM units are connected to a third bus connected to the first bus through a bus driver, a high-speed stable operation can be carried out even in the case where a plurality of RAM units or a single large-capacity RAM unit is connected.

In the case where the processing speed of the CPU is further heightened so that the time of signal propagation through the bus driver becomes a problem, it is preferable that the RAM units are connected to the third bus which is connected to the first bus via a pipeline register. By use of the pipeline register, data having appeared in the third bus connected to the RAM units can be supplied to the first bus to which the CPU is connected in accordance with the clock signal after the passage of a predetermined time of one clock or more. As a result, while the apparent propagation delay time can be set between the RAM unit and the CPU, the length of wiring of each bus can be shortened by insertion of the pipeline register. Accordingly, the image processing apparatus is hardly affected by noise, so that high-speed data communication adapted to a high-speed CPU can be made between the CPU and the RAM unit.

This system in which the first and third buses are connected to each other through the pipeline register to exchange data between the CPU and the RAM unit is useful not only for the image processing apparatus but also for an information processing apparatus in which a large amount of data are read-from/written-into the RAM. Further, by use of the image processing apparatus having a CPU capable of performing high-speed data transfer between the CPU and the RAM unit, a large amount of input data for high-resolution color printing can be processed in a short time. This results in a printer which performs high-quality and high-speed printing.

DESCRIPTION OF THE PREFERRED EMBODIMENTS

1. First Embodiment

Figure 1:
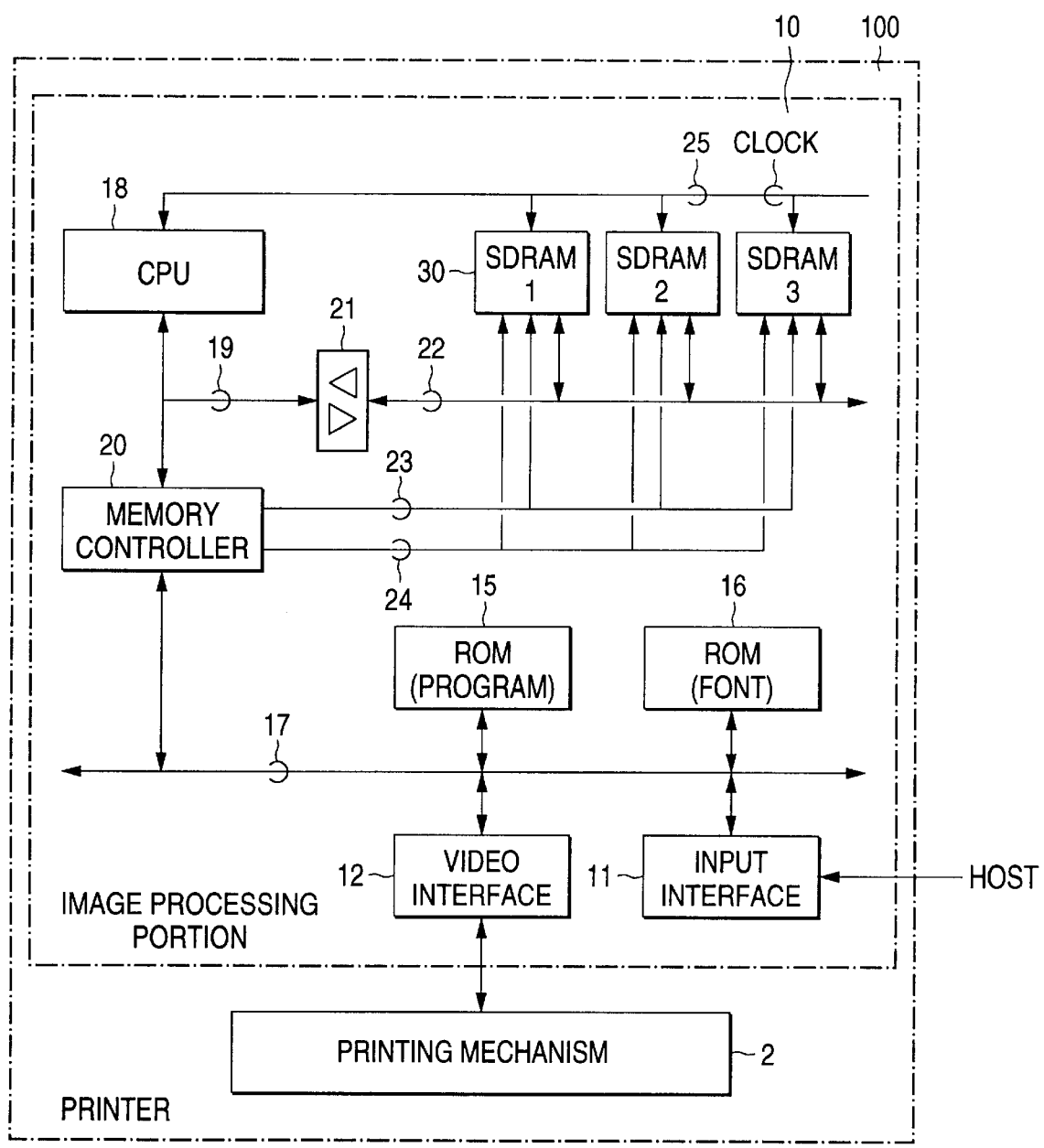
FIG. 1 is a block diagram showing the schematic configuration of a printer according to a first embodiment of the present invention.

An embodiment of the present invention will be described below with reference to the drawings. FIG. 1 shows the schematic configuration of a printer 100 according to the present invention. In this embodiment, the printer 100 has an image processing portion 10 for converting input data supplied from a host into image-forming output data, and a printing mechanism 2 supplied with the data output by the image processing portion 10 to perform printing on the basis of the output data in the same manner as the aforementioned printer. Parts which are the same as those described above are referenced correspondingly to avoid unnecessarily duplicative description of them.

In this embodiment, the image processing portion 10 has a CPU 18 allowed to operate at a high speed, a memory controller 20 connected to the CPU 18 through a CPU bus 19, a program ROM 15 connected to the memory controller 20 via a low-speed memory bus 17, and a font ROM 16 connected to the memory controller 20 via the memory bus 17. Additionally, an input interface circuit 11, a video interface circuit 12, etc. are connected to the memory bus 17. Optionally, other functional circuits such as a low-speed DRAM, etc., may be connected to the memory bus 17.

In the image processing portion 10 of this embodiment, a RAM bus 22 is connected to the CPU bus 19 through a bus driver 21. Three SDRAM module units 30 are connected to the RAM bus 22 so that the CPU 18 can read/write data from/into the SDRAM units 30 through the CPU bus 19, the bus driver 21 and the RAM bus 22. Of course, the number of SDRAM units connected to the RAM bus 22 is not limited to this embodiment but it may be less than or more than three.

Address data from the memory controller 20 are supplied to the SDRAM units 30 through an address bus 23. Control signals from the memory controller 20 are supplied to the SDRAM units 30 through a control signal wiring 24. A clock signal 25 given to the CPU 18 for synchronous operation is inputted to the SDRAM units 30 simultaneously, so that the SDRAM units 30 operate with the same operating frequency as that of the CPU 18.

In the image processing portion 10 according to this embodiment, the SDRAM units 30 are connected to the CPU bus 19 through the bus driver 21 so that data from the CPU 18 can be directly inputted/outputted into/from the SDRAM units 30. Further, the SDRAM units 30 can operate at a high speed with the clock signal of the same operating frequency as that of the CPU 18, so that data can be read/written between the CPU 18 and the SDRAM units 30 without provision of any wait state. Accordingly, burst transfer of a large amount of data can be made between the CPU 18 and the SDRAM units 30 at a high speed.

Further, in the image processing portion 10 according to this embodiment, the CPU bus 19 and the RAM bus 22 are connected to each other by the two-way bus driver 21 to suppress the influence of the connection of the RAM bus 22 on the driving ability of the CPU 18. Because the driving ability of the RAM bus 22 is improved by connection of the RAM bus 22 through the bus driver 21, stable operation can be carried out even in the case where such a plurality of SDRAM units 30 are connected to the RAM bus 22.

In image processing in the page printer 100, a memory of 10 Mbytes or more is required for generating and storing one-page's intermediate data or output data. It is necessary that stable operation can be guaranteed even in the case where such a plurality of SDRAM units or modules 30 are connected to the RAM bus 22. Accordingly, the image processing portion 10 according to this embodiment is adapted to a processing apparatus which is required to process a large amount of image data in a short time in a page printer, or the like.

Figure 2:
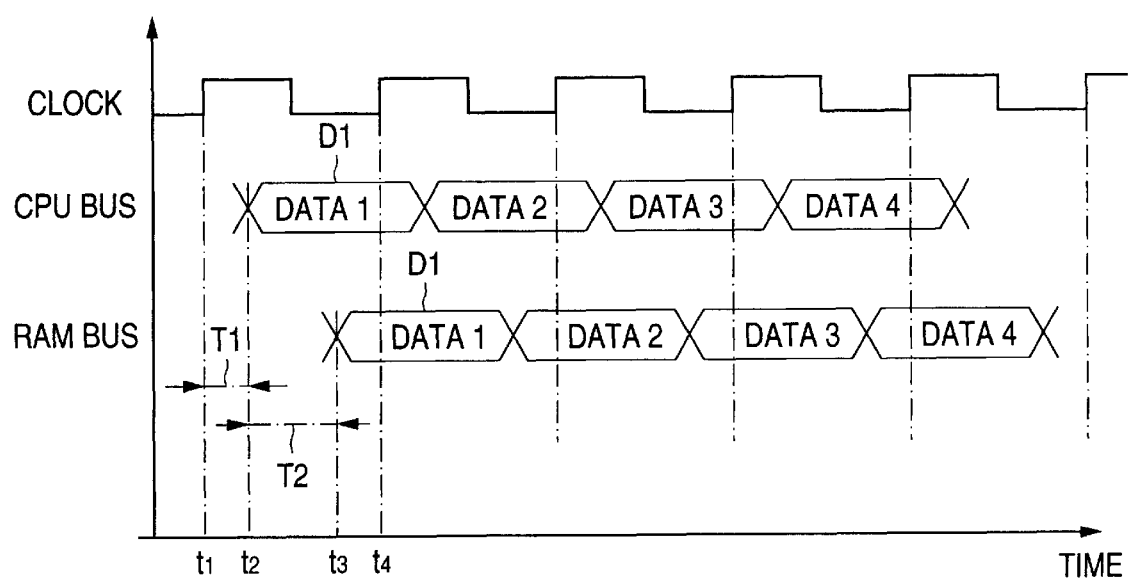
FIG. 2 is a timing chart showing an example of data transfer in the image processing portion of the printer depicted in FIG. 1.

FIG. 2 shows timing waveforms in the case where data transfer from the CPU 18 to any one of the SDRAM modules 30 is performed four times. At a point of time $t_2$ after the passage of the time period T1 of the output delay time of the CPU bus 19 and the wiring delay time of the CPU bus 19 from the point of time $t_1$ where the clock signal rises initially, a first data D1 appears in the CPU bus 19.

At a point of time $t_3$ after the passage of the time period T2 of the output delay time (from input to output) of the bus driver 21 and the wiring delay time of the RAM bus 22 from the point of time $t_2$, the first data D1 appears in the RAM bus 22. Although the time of appearance of the first data D1 in the RAM bus 22 varies in accordance with various conditions of the image processing portion 10, the first data D1 appears in the RAM bus 22 when the operating frequency is about 66 MHz. Accordingly, the current data can be written in the SDRAM units 30 synchronized with the CPU 18 before the next data will be outputted from the CPU 18 after the passage of one clock. As a result, the characteristic of the SDRAM units 30 allowed to operate at a high speed is utilized so that high-speed data transfer can be performed.

As described above, in the image processing portion 10 in this embodiment, high-speed data transfer can be performed between the CPU and the SDRAM units. Accordingly, the main processing time spent by the image processing portion to process input data from a host on the basis of font data, or the like, stored in the ROM 16 to thereby convert the input data into intermediate data or output data, can be shortened greatly.

In recent years, the amount of data to be processed in the image processing portion 10 has increased remarkably because higher-resolution printing-out is required for smooth graphic or character printing and, further, multi-gradation high-resolution printing is required also for color printing. In the image processing portion 10 of this embodiment, a large amount of data can be processed in a short time. Accordingly, by employing the image processing portion 10 of this embodiment, it is possible to provide a printer in which high-resolution or multi-gradation printing-out can be smoothly performed in a short time.

2. Second Embodiment

Figure 3:
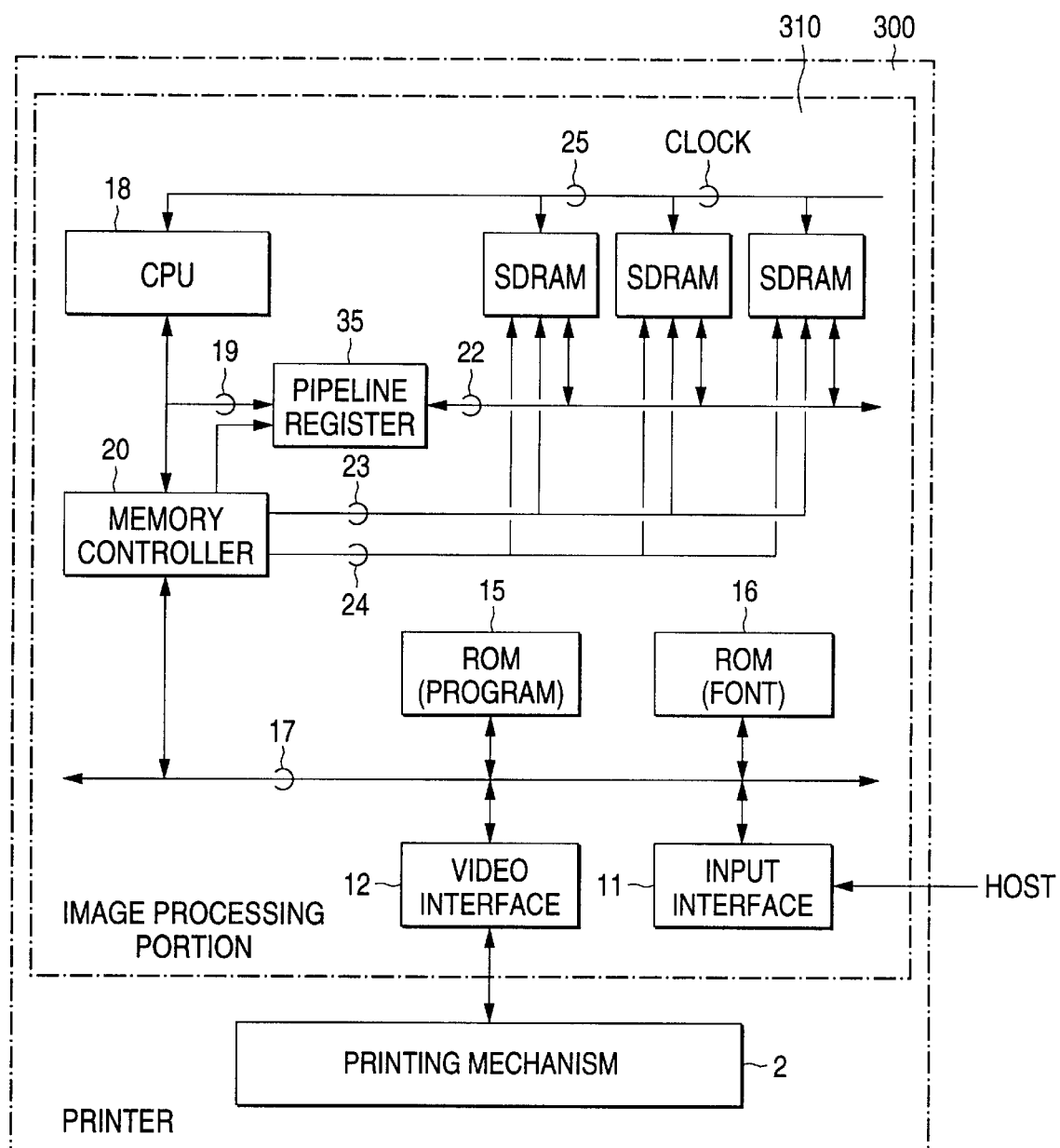
FIG. 3 is a block diagram showing the schematic configuration of a printer according to a second embodiment of the present invention.

FIG. 3 shows the schematic configuration of a printer 300 according to another embodiment of the present invention. The printer 300 in this embodiment is similar to the printer in the first embodiment except that the bus driver in the image processing portion of the printer in the first embodiment is replaced by a pipeline register 35 in this embodiment. In FIG. 3, parts the same as those in the first embodiment are referenced correspondingly to avoid unnecessarily duplicative description of them.

As described above, when configuration is made such that data from the CPU 18 can be directly read/written from/in the SDRAM units 30 through the RAM bus 22 connected to the CPU bus 19, the processing time can be shortened greatly. Further, when configuration is made such that the CPU bus 19 and the RAM bus 22 are connected to each other by the bus driver, a large capacity of SDRAM unit or a plurality of SDRAM units 30 adapted for image processing can be connected to the RAM bus 22.

If the processing speed of the CPU in the configuration according to the first embodiment is further increased to make the speed of the CPU bus 19 higher, there is a possibility that the total delay time (the sum of the delay time T1 and the delay time T2 shown in FIG. 2) of propagation from the CPU 18 to the SDRAM units 30 via the CPU bus 19 and the bus driver would exceed one clock period. Additionally, as the total delay time approaches but does not exceed one period, it is believed that signals are prevented from becoming stable due to reflection noise. Accordingly, in the configuration shown in the first embodiment, there is a possibility that the CPU is not stable when the operating frequency of the CPU is 100 MHz or more.

On the contrary, in the second embodiment, a pipeline register 35 is provided instead of the bus driver. A pipeline operation is carried out by the pipeline register 35 with use of the same clock signal as that used in the CPU 18 and the SDRAM units 30, so that data can be transferred from the CPU to the SDRAM units or from the SDRAM units to the CPU at a high speed in synchronism with the clock signal while the propagation delay time is elongated apparently. Further, because the wiring lengths of the CPU bus 19 and the RAM bus 22 connected to opposite sides of the pipeline register 35 are shortened, the signal is hardly affected by noise and has a short stabilization time. As a result, data transfer can be performed at a high speed of 100 MHz or more.

Figure 4:
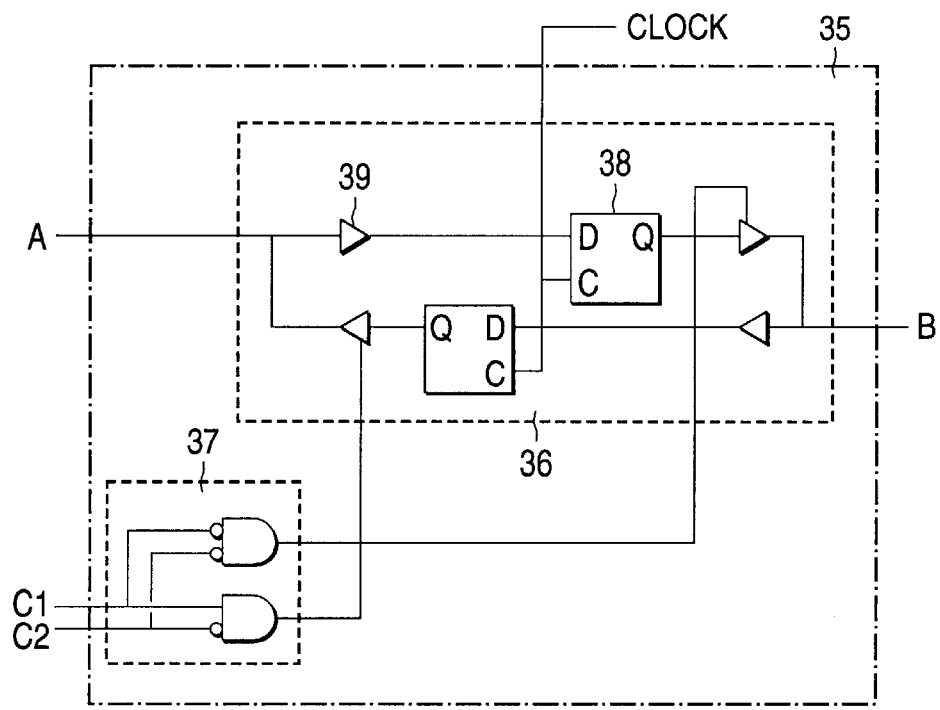
FIG. 4 is a diagram showing the schematic configuration of a pipeline register.

As shown in FIG. 4, the pipeline register 35 has a register portion 36 prepared in accordance with the number of bits to be transferred, and a control portion 37. The register portion 36 is constituted by a combination of bus transceiver circuits 39 and D-type flip-flop circuits 38. In this embodiment, the pipeline register 35 can operate in several modes by combination of control signals C1 and C2 supplied to the pipeline register 35 from the memory controller 20.

When, for example, the combination of control signals C1 and C2 exhibits (0,0), the pipeline register 35 performs a pipeline operation in which data are transferred from A to B through the flip-flop circuits 38 so that signals which have appeared in A successively will appear in B successively after one clock. When the combination of control signals C1 and C2 exhibits (1,0), data are transferred from B to A. When the control signal C2 exhibits 1, data are held so that A and B are separated from each other.

Of course, the number of flip-flop circuits 38 is not limited to the two shown in this embodiment; three or more flip-flop circuits may be connected for pipeline processing.

Figure 5:
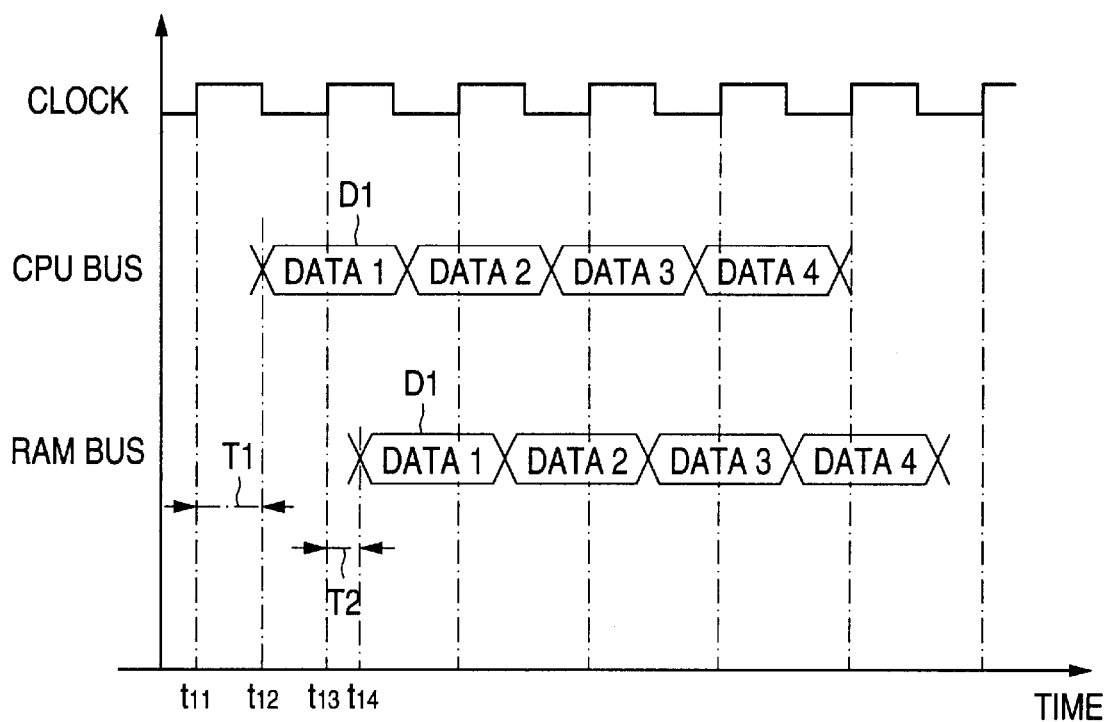
FIG. 5 is a timing chart showing an example of data transfer in the image processing portion of the printer depicted in FIG. 3.
Figure 6:
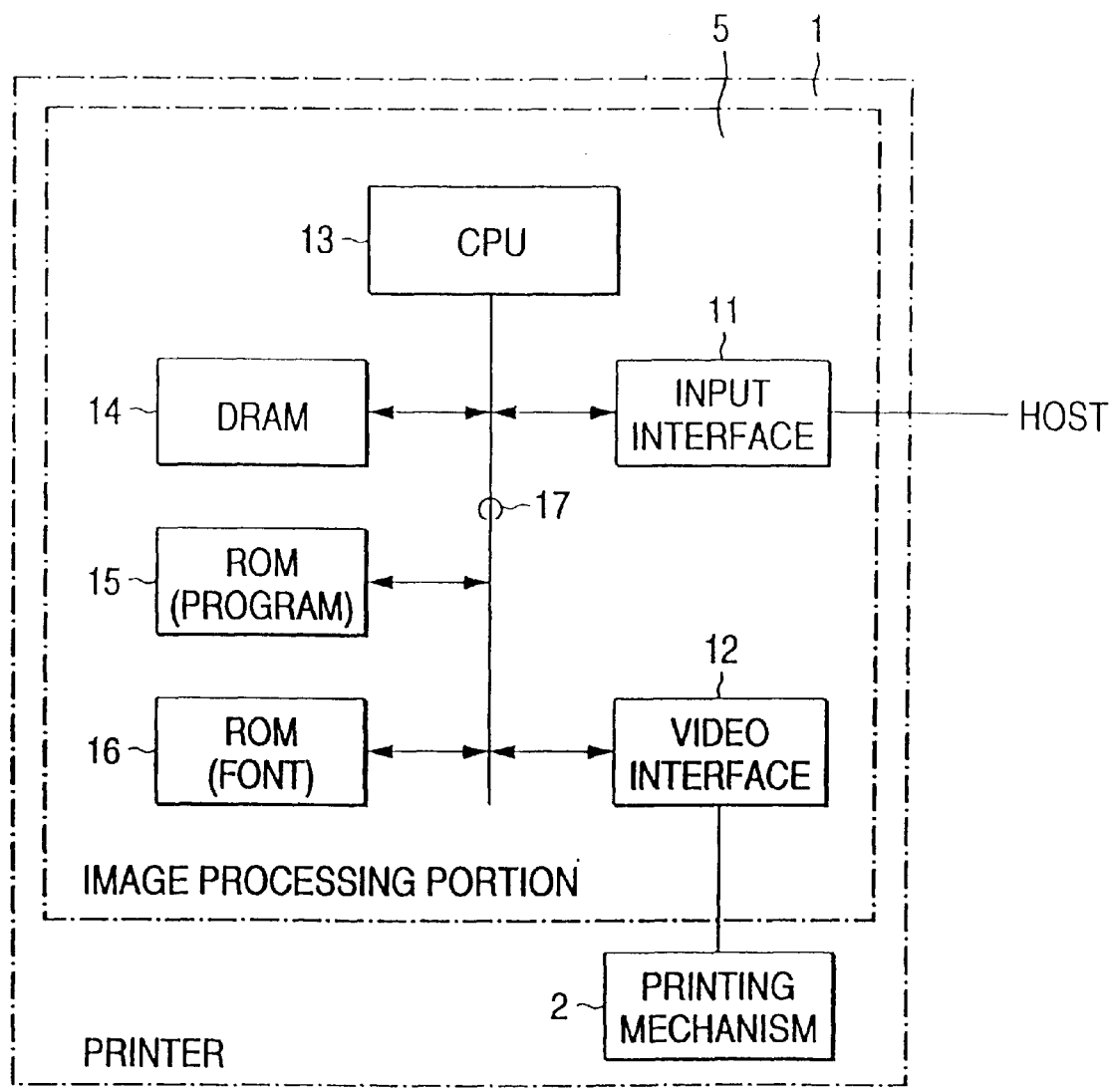
FIG. 6 is a block diagram showing the schematic configuration of a printer which does not embody the present invention.
Figure 7:
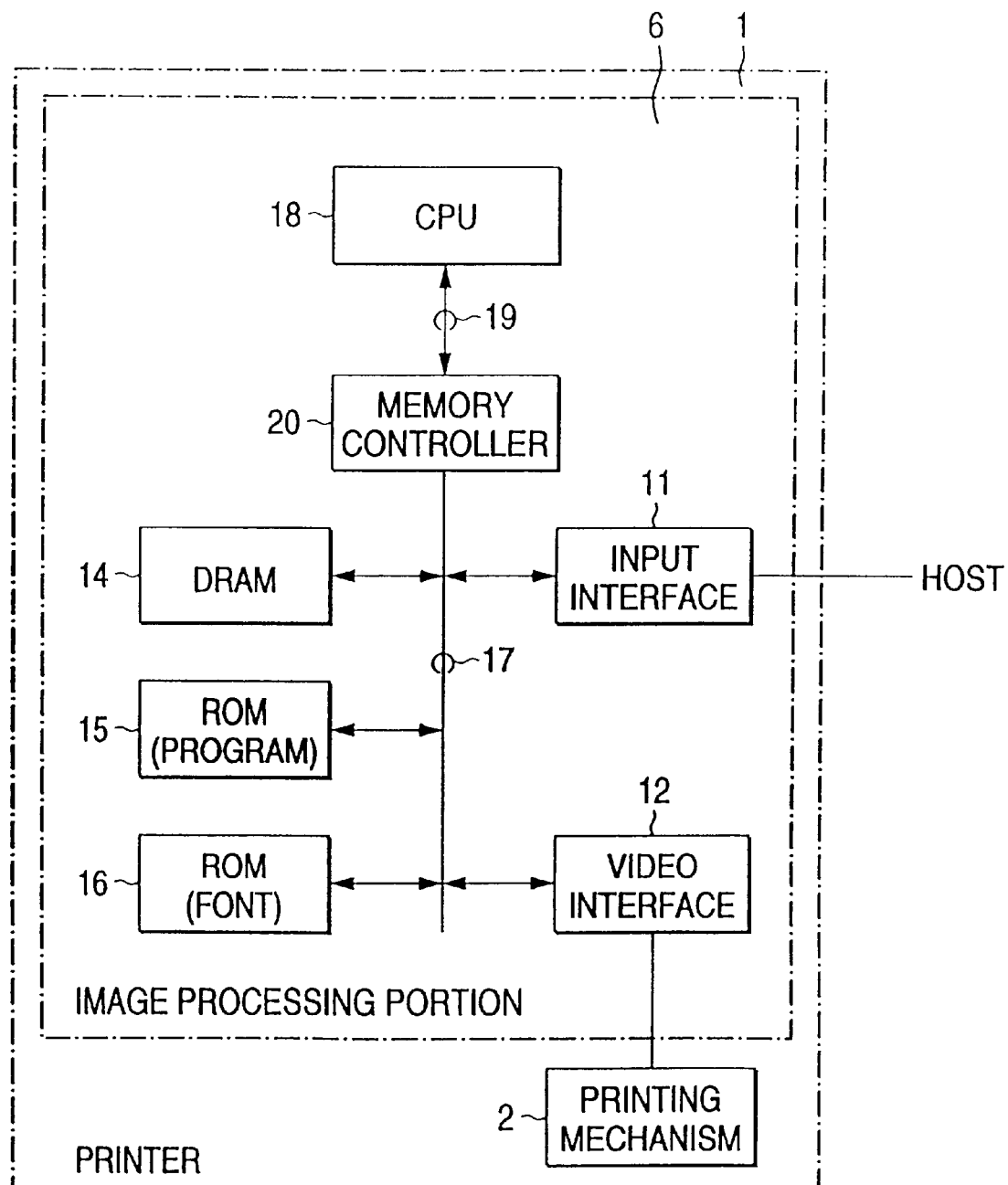
FIG. 7 is a block diagram showing the schematic configuration of another printer which does not embody the present invention.

FIG. 5 shows timing waveforms in the case where data transfer from the CPU 18 to the SDRAM modules 30 is performed four times in the image processing portion 310 in this embodiment. At a point of time $t_{12}$ after the passage of the time period T1 of the output delay time of the CPU bus 19 and the wiring delay time of the CPU bus 19 from the point of time $t_{11}$ where the clock signal rises-initially, a first data D1 appears in the CPU bus 19 and is caught in the pipeline register 35. At a point of time $t_{14}$ after the passage of the time period T2 of the output delay time (up to the output) of the pipeline register 35 and the wiring delay time of the RAM bus 22 from the point of time $t_{13}$ where the next clock signal rises, the first data D1 appears in the RAM bus 22. Following the first data D1, data appear successively in the RAM bus 22 through the pipeline register 35 whenever one clock is given.

Accordingly, the propagation delay time of 2 clocks is required apparently for the appearance of the first data D1 but the SDRAM 30 operates in synchronism with the clock signal because data transfer per se is performed in synchronism with the clock signal. Accordingly, the image processing portion 310 can operate with a higher-speed clock signal compared with the first embodiment. As a result, higher-speed data transfer can be performed compared with the first embodiment.

As described above, in the image processing portion 310 in this embodiment, higher-speed stable data transfer can be performed between the CPU and the SDRAM units. Accordingly, input/output processing of a larger amount of data can be performed at a high speed. Further, because it is unnecessary that wait states are set whenever input/output processing is performed with respect to the CPU, the ability of the high-speed-operating CPU can be fulfilled sufficiently without hindrance of the processing ability of the CPU. Accordingly, by employing the image processing portion 10 in this embodiment in a control portion of the printer 1, high-resolution processing of a large amount of image data can be performed in a short time, so that printing speed can be improved more greatly.

Besides the above-described printer application, such a pipeline register is generally useful so that a CPU and SDRAM units can make access to each other directly, and obstructions caused by bus-propagation delay time and reflection noise can be avoided. Accordingly, there can be provided an information processing apparatus such as a computer, or the like, in which stable data transfer between the CPU and the memory at a high speed of 100 MHz or more can be achieved.

As described above, in the present invention, DRAMs are connected to a CPU bus to permit a CPU to make direct access to the DRAMs to thereby make it possible to provide an image processing apparatus which is high in processing speed so that the apparatus is adapted for image processing in which a large amount of data are read/written. Further, when SDRAMs are used as the memory, the data transfer speed can be improved more greatly because input/output processing can be made in synchronism with the CPU.

Moreover, when a bus driver is put between the RAM bus and the CPU bus, the driving ability of the RAM bus can be improved. Accordingly, a large capacity SDRAM or a plurality of SDRAMs capable of storing a large amount of data necessary for image processing can be connected to the RAM bus while a stable operation can be performed.

Furthermore, when a pipeline register is utilized in place of the bus driver, both lowering of transfer speed and lowering of stability caused by the bus-propagation delay time, or the like, can be suppressed. Accordingly, higher-speed and more-stabilized data transfer performance is possible. By use of the image processing apparatus according to the present invention, there can be provided a printer which is so high in image processing speed that high quality printing can be performed at a high speed. Besides printers, the invention is also applicable to information processing apparatus so as to provide an ability of processing in inputting/outputting a large amount of data into/from the memory at a high speed.

Although the invention has been described in terms of preferred embodiments, it will be understood by those of ordinary skill in the art that various modifications may be made to the described embodiments without departing from the spirit and scope of the invention.

This application is based on Japanese Patent Application No. 9-232639, which is incorporated by reference herein for all purposes.

What is claimed is:

1. An image processing apparatus for converting input data into image-forming output data by using programs or font data stored in at least one ROM circuit, and for outputting the image-forming output data, the image processing apparatus comprising:

a CPU;

at least one RAM circuit for storing at least one of output data or intermediate data converted by said CPU;

a memory controller for controlling access by said CPU to said ROM circuit and said RAM circuit; and a first bus to which said memory controller and said CPU are connected, and a second bus to which said memory controller and said ROM circuit are connected, said at least one RAM circuit being connected to said first bus via a third bus whose signals are controlled by a bus driver.

2. The image processing apparatus according to claim 1, wherein said RAM circuit is constituted by a synchronous DRAM.

3. The image processing apparatus according to claim 1, wherein a plurality of RAM circuits are connected to said third bus.

4. An image processing apparatus for converting input data into image-forming output data by using programs or font data stored in at least one ROM circuit, and for outputting the image-forming output data, the image processing apparatus comprising:

a CPU;

at least one RAM circuit for storing at least one of output data or intermediate data converted by said CPU;

a memory controller for controlling access by said CPU to said ROM circuit and said RAM circuit; and a first bus to which said memory controller and said CPU are connected, and a second bus to which said memory controller and said ROM circuit are connected, said at least one RAM circuit being connected to said first bus via a third bus whose signals are controlled by a pipeline register.

5. The image processing apparatus according to claim 4, wherein a plurality of RAM circuits are connected to said third bus.

6. The image processing apparatus according to claim 4, wherein said RAM circuit is constituted by a synchronous DRAM.

7. An information processing apparatus comprising:
a CPU;
a ROM circuit in which at least programs or data are stored;
at least one RAM circuit for presenting a temporary storage area for said CPU;
a memory controller for controlling access by said CPU to said ROM circuit and said RAM circuit;
a first bus to which said memory controller and said CPU are connected;
a second bus to which said memory controller and said ROM circuit are connected; and
a third bus connected to said first bus through a pipeline register, said at least one RAM circuit being connected to said third bus.

8. The information processing apparatus according to claim 7, wherein said RAM circuit connected to said third bus is constituted by a synchronous DRAM.

9. A printer comprising:
an image processor which converts input data into image-forming output data by using programs or font data stored in at least one ROM circuit, and which outputs the image-forming output data; and
a printing mechanism for performing printing on the basis of said output data;
wherein said image processor comprises:
a CPU;
at least one RAM circuit for storing at least one of output data or intermediate data converted by said CPU;
a memory controller for controlling access by said CPU to said ROM circuit and said RAM circuit; and
a first bus to which said memory controller and said CPU are connected, and a second bus to which said memory controller and said ROM circuit are connected, said at least one RAM circuit being connected to said first bus via a third bus whose signals are controlled by a bus driver.

10. A printer comprising:
an image processor which converts input data into image-forming output data by using programs or font data stored in at least one ROM circuit, and which outputs the image-forming output data; and
a printing mechanism for performing printing on the basis of said output data;
wherein said image processor comprises:
a CPU;
at least one RAM circuit for storing at least one of output data or intermediate data converted by said CPU;
a memory controller for controlling access by said CPU to said ROM circuit and said RAM circuit; and
a first bus to which said memory controller and said CPU are connected, and a second bus to which said memory controller and said ROM circuit are connected, said at least one RAM circuit being connected to said first bus via a third bus whose signals are controlled by a pipeline register.

* * * * *